United States Patent [19]

Sakoda

[11] Patent Number: 4,589,494

[45] Date of Patent: May 20, 1986

[54] METHOD OF CONTROLLING THE REMOVAL OF FLOWABLE MATERIAL FROM A WELL

[75] Inventor: Lester M. Sakoda, Los Angeles, Calif.

[73] Assignee: Getty Synthetic Fuels, Inc., Signal Hill, Calif.

[21] Appl. No.: 613,866

[22] Filed: May 23, 1984

[51] Int. Cl.[4] .................... E21B 43/12; E21B 43/18
[52] U.S. Cl. ........................ 166/372; 166/68; 166/374; 417/137
[58] Field of Search ............... 166/372, 112, 107, 105, 166/105.5, 369, 374, 373, 68; 417/118, 137, 147

[56] References Cited

U.S. PATENT DOCUMENTS

| | | | |
|---|---|---|---|
| 868,487 | 10/1907 | Rosengarten | 417/118 |
| 964,693 | 7/1910 | Richardson | 417/118 |
| 997,661 | 7/1911 | Ellison | 417/118 |
| 1,616,017 | 2/1927 | Williams | 417/118 |
| 4,527,633 | 7/1985 | McLaughlin et al. | 166/372 X |

Primary Examiner—Stephen J. Novosad
Attorney, Agent, or Firm—Gordon L. Peterson

[57] ABSTRACT

A method of controlling the removal of flowable material from a well using a pump in the well which includes a housing having at least one aperture leading to an interior chamber within the housing so that flowable material from the well can enter the chamber and a pressure responsive valve for opening and closing the aperture. Gas is supplied under pressure through a conduit to the pump to close the valve to terminate entry of the flowable material into the chamber and to force the flowable material out of the pump. The flow of gas under pressure is then terminated, and gas from the conduit is vented. The venting is carried out during the time that the gas under pressure is supplied through the conduit to the pump and following the termination of the flow of gas to the pump to bleed gas under pressure from the conduit and the pump so that flowable material from the well can again enter the chamber.

10 Claims, 2 Drawing Figures

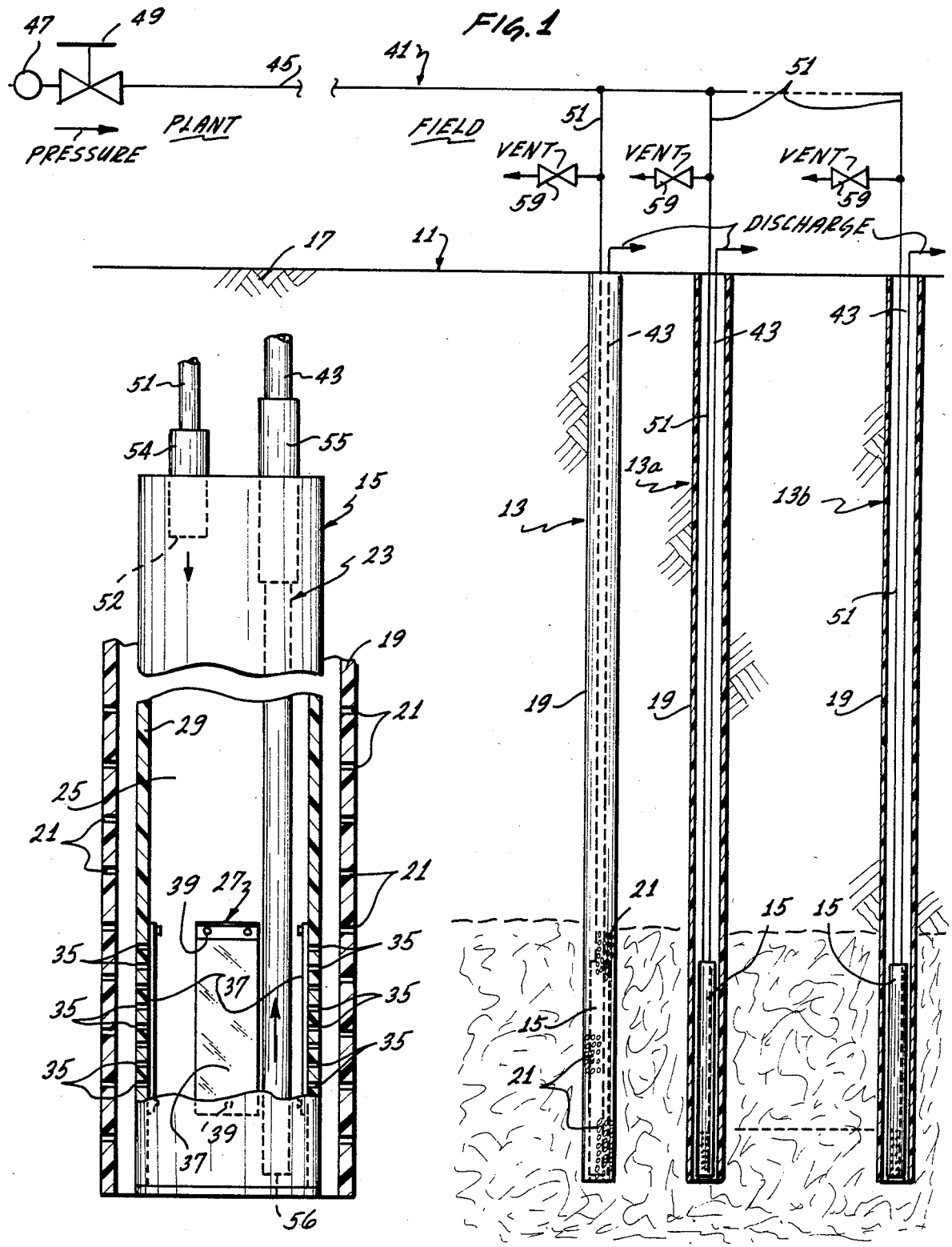

METHOD OF CONTROLLING THE REMOVAL OF FLOWABLE MATERIAL FROM A WELL

BACKGROUND OF THE INVENTION

It is often necessary to remove various forms of flowable material from a well. The flowable material is essentially non-gaseous and may include a significant liquid or sludge component. Particulate solids may be included in the flowable material to various degrees.

One example of the need to remove flowable material of this type occurs in landfill gas wells. Landfills typically contain an essentially liquid component or leachate which seeps into the well, and this progressively diminishes the recovery of landfill gas from the well.

To remove this flowable material, a gas-operated pump can be provided in the well. A gas-operated pump of this type may include, for example, a housing, at least one aperture in the housing leading to an interior chamber within the housing and a pressure-responsive valve for opening and closing the aperture. The valve is normally open so that the flowable material from the well can enter the chamber. Gas under pressure is then provided through a conduit to the pump to close the valve to terminate entry of the flowable material into the chamber. In addition, the gas under pressure within the chamber forces the flowable material from the chamber out of the pump. A pump of this type is shown, for example, in Elliott U.S. Pat. No. 2,412,723.

It is known to use liquid level detectors to control the supply of gas under pressure to the pump. Liquid level detectors are typically electrically operated, and this may require the running of thousands of feet of electrical wiring from a central control station to numerous remotely located wells. In addition, electrical components and conductors are undesirable in hazardous environments, such as gas wells.

SUMMARY OF THE INVENTION

This invention solves these pump control problems and eliminates the liquid level detectors and the associated wiring. This reduces the cost of the installation and makes the pumps more suitable for use in a hazardous environment, such as in a gas well. With this invention, gas under pressure is supplied through a conduit to the pump at a desired time which may be, for example, at regular or irregular intervals or following inspection of the particular well. In any event, the supply of gas under pressure and the termination of the flow of gas under pressure to the pump are not caused by device-originated signals from the pump, e.g., from liquid level detectors or the like which provide information on the level of the flowable material in the pump.

After termination of the flow of gas under pressure through the conduit to the pump, it is necessary to reduce the pressure of the gas in the pump so that the pressure-responsive valve can open to allow flowable material from the well to again enter the chamber of the pump. This necessitates venting of the gas from the conduit and from the pump. In order to accomplish this without any signal producing device which provides liquid level information, this invention provides for the continuous venting of gas from the conduit during the time that the gas under pressure is being supplied through the conduit to the pump and following the termination of the flow of gas through the conduit to the pump. Thus, gas under pressure is bled from the conduit and the pump to allow the flowable material from the well to again enter the chamber.

In operation of the pump, the supply and termination of gas under pressure to the pump occur repeatedly in a sequence through a plurality of cycles. To completely avoid the need for automatically or manually operated controls at the pump, the venting preferably occurs through an orifice which is continuously open during and between the times that gas under pressure is being supplied to the pump.

Although the orifice may be of fixed area, preferably it is a variable area orifice. This allows the size of the orifice to be set in accordance with the particular requirements of the pump. Preferably, the orifice vents no more than about twenty-five percent of the gas under pressure supplied through the conduit for the pump. Of course, the variable area orifice, once set, becomes a fixed area which can be used during the venting process.

The orifice may be in the pump or conduit or any other location where it communicates with the chamber within the pump. Preferably, the orifice is located in the conduit adjacent the well and above ground so that it is accessible for manual inspection and adjustment of orifice size.

The control method of this invention is applicable to one or more of the gas pumps. When more than one gas pump is used, preferably each of the pumps has its own orifice.

The invention, together with additional features and advantages thereof, may best be understood by reference to the following description taken in connection with the accompanying illustrative drawing.

BRIEF DESCRIPTION OF THE DRAWING

FIG. 1 is a partially schematic sectional view illustrating one form of apparatus that can be used to carry out the method of this invention.

FIG. 2 is an enlarged fragmentary sectional view showing the bottom of a well with a gas-operated pump in the well.

DESCRIPTION OF THE PREFERRED EMBODIMENT

FIG. 1 shows a landfill 11 having identical landfill gas wells 13, 13a and 13b installed therein. Identical gas-operated pumps 15 are installed near the bottom of each of the wells 13, 13a and 13b. The landfill 11 comprises refuse 17 which decomposes to produce a landfill gas which includes methane.

Each of the wells 13—13b comprises a tubular casing 19 having slots 21 for admitting landfill gas into the casing 19. The interior of the casing 19 may be maintained at a reduced pressure in accordance with known techniques to induce the flow of landfill gas into the casing 19.

The landfill 11 contains leachate which flows through the slots 21 into the casing 19. The leachate, which may be considered as essentially in liquid form, progressively fills the casing and closes off the slots 21. To the extent that the slots 21 are closed off, landfill gas is blocked from flowing into the well, and landfill gas production from the well is, to that extent, reduced.

The pumps 15 are provided to pump the leachate from the associated well 13—13b. Because the pumps 15 are identical, only one of the pumps is described herein in detail, and corresponding parts are designated by corresponding reference numerals. In the embodiment illustrated, the pump 15 lies below the uppermost slots 21 and rests on the bottom of the well with its long axis generally vertical. The pump 15 includes an elongated housing 23, an interior chamber 25 within the housing, and a pressure-responsive valve 27 for controlling the flow of flowable material into the housing.

Although various different constructions are possible, in the embodiment illustrated, the housing 23 includes a cylindrical, elongated tube or pipe 29 (FIG. 2), the opposite ends of which are closed to form the chamber 25. The tube 29 provides a peripheral wall for the housing 23.

To permit the leachate to enter the housing 23, the valve 27 includes at least one aperture, such as a plurality of apertures 35 extending through the tube 29. The lowermost of the apertures 35 is near the lower end of the housing 23. In order to control the entry of leachate into the chamber 25, the valve 27 includes a plurality of resilient strips 37 of silicone or other suitable resilient material mounted within the chamber on the tube 29. The apertures 35 are in rows which extend axially of the tube, and each of the strips 37 extends longitudinally across its associated row or rows of apertures 35. Fasteners 39 attach the opposite ends of the strips 37 to the tube 29 above and below, respectively, the associated row of apertures. The strips 37 are pressure responsive and can be urged radially outwardly to seal off the associated apertures 35 to substantially prevent the flow of leachate through the apertures out of the chamber 25. Conversely, in the absence of sufficient pressure within the chamber 25, the leachate from the landfill 11 can pass through the apertures 35 into the interior chamber 25.

To urge the resilient strips 37 radially outwardly to close the apertures 35, and hence close the valve 27, gas under pressure is supplied through a conduit 41 to the pumps 15. This terminates entry of the leachate into the interior chambers 25 of each of the pumps 15 and forces flowable material from the chambers 25 out of the pumps through discharge conduits 43. The conduit 41 includes a header 45 which is coupled to a source of pressurized gas 47, such as compressed air, through a control valve 49. Typically, the source 47 and the valve 49 are located at a central control station or plant, and the wells 13—13b and the associated pumps 15 are in the field and remotely located with respect to the control station. For example, the wells 13—13b may be widely spaced and may be a mile or more from the control station.

The conduit 41 also includes conduit sections 51 which are coupled at one end to the header 45 and which extend respectively into the wells 13—13b and terminate at an inlet 52. The conduit section 51 is appropriately joined to the upper end wall of the housing 23 by a coupling 54 (FIG. 2).

The discharge conduit 43 may be constructed of one or more pipes or tubes appropriately joined together, and as shown in FIG. 2 by way of example, it includes a coupling 55 mounted on the upper end of the pump 15 to join two portions of the discharge conduit together. The discharge conduit 43 has an inlet 56 adjacent the bottom of the housing 23 and extends to any desired location to which it is desired to discharge the leachate. In the embodiment illustrated, the discharge conduits 43 each extend vertically upwardly from their respective pumps 15 and out of the associated wells 13.

The pumps 15 do not have any liquid level detectors or any other apparatuses which can provide signals to the control station which is indicative of the level of the leachate in the interior chambers 25. Accordingly, no electrical power is furnished to the pumps 15, and opening of the valve 49 is accomplished manually or automatically at regular or irregular intervals. When the valve 49 is open, it supplies compressed air through the header 45 and the conduit sections 51 to the chambers 25 to force the resilient strips 37 into sealing engagement with the surfaces surrounding the associated apertures 35 to close the valves 27 and to pressurize the leachate within the chambers 25. The pressure is sufficient to force the leachate in the chambers 25 upwardly through the discharge conduits 43 and out of the associated wells.

The valve 49 is left open for a length of time which is reasonably calculated to be sufficient to allow substantially all of the leachate in each of the pumps 15 to be completely discharged. Following this, the valve 49 is closed to terminate the flow of gas under pressure through the conduit 41 to the pumps 15.

It is necessary to reduce the pressure in the interior chambers 25 so that the valve 27 will again allow leachate to enter the interior chambers through the apertures 35. In the illustrated embodiment of the invention, this is accomplished by a vent valve 59 coupled to each of the conduit sections 51. Each of the vent valves 59 is manually operable, and no electrical power is run to it. Each of the vent valves 59 provides an orifice which is continuously open. This vents gas from the conduit 41 and the associated pump 15 continuously during the time that the gas under pressure is being supplied through the conduit 41 to the pump and following the closure of the valve 49. This bleeds gas under pressure from the conduit 41 and the interior chambers 25 following closure of the valve 49 to allow the valves 27 to open and to allow leachate to again enter the chambers 25.

Although fixed area orifices can be used in lieu of the valves 59, the valves have the advantage of permitting the orifice area to be varied in accordance with the venting requirements at each of the pumps 15. The valves 59 are preferably located above the surface of the refuse 17 and adjacent the associated well 13—13b. Because the valves 59 are remotely located, once they have been manually adjusted, the areas of the orifices provided by the valves 59 will ordinarily remain constant thereafter. Of course, only one of the vent valves 59 is required inasmuch as all of the pumps 15 are interconnected by the conduit 41. However, one vent valve per pump provides for more rapid venting and permits adjustments in the orifice area for each of the pumps.

During the course of operation, the valve 49 will be opened and closed repeatedly to cause the pumps 15 to repeatedly admit leachate and discharge the leachate. Typically, there will be a dwell time between these adjacent operating cycles, i.e., the valve 49 will be closed for some length of time which is reasonably calculated to permit significant volumes of leachate to enter the respective interior chambers 25. The valves 59 remain open continuously when the valve 49 is open and when it is closed. Thus, the vent valves 59 vent pressure substantially continuously during the time that the conduit 41 is pressurized even though gas under pressure is being furnished to the interior chambers 25. However, preferably, each of the vent valves 59 vents no more than about twenty-five percent of the gas under pressure supplied through the associated conduit section 51 to the associated pump 15.

The method of this invention is applicable to one or more of the pumps 15, and the three pumps illustrated are purely illustrative. The method can be carried out in various kinds of different wells.

Although an exemplary embodiment of the invention has been shown and described, many changes, modifications and substitutions may be made by one having ordinary skill in the art without necessarily departing from the spirit and scope of this invention.

I claim:

1. A method of controlling the removal of flowable material from a well comprising:

providing a pump in the well with the pump including a housing, at least one aperture in the housing leading to an interior chamber within the housing whereby flowable material from the well can enter the chamber and a valve responsive to gas under pressure to close the aperture and force flowable material from the chamber out of the pump and to a reduction in such pressure to allow the valve to open to allow flowable material from the well to enter the chamber through the aperture;

supplying a gas under pressure through a conduit to the pump to close the valve to terminate entry of the flowable material into the chamber and to force the flowable material from the chamber out of the pump;

terminating the flow of gas under pressure through the conduit to the pump; and continuously venting gas from the conduit during the time that gas under pressure is being supplied through the conduit to the pump and following said step of terminating to bleed gas under pressure from the conduit and the pump to allow flowable material from the well to again enter the chamber.

2. A method as defined in claim 1 wherein prior to said step of terminating said step of venting vents no more than about twenty-five percent of the gas under pressure supplied through the conduit for said pump.

3. A method as defined in claim 1 wherein said step of venting is carried out through an orifice which is of fixed area during said step of venting.

4. A method as defined in claim 1 wherein said step of venting is carried out through a variable area orifice, said method includes adjusting the area of the orifice to provide the desired flow prior to said step of venting and maintaining the area of said orifice constant during said step of venting.

5. A method as defined in claim 1 including repeating said step of supplying following said step of terminating and wherein said step of venting is carried out through an orifice, and said method includes maintaining said orifice continuously open during and between said steps of supplying.

6. A method of controlling the removal of flowable material from a remotely located well having a pump therein without the use of level sensors at the pump or without extending electrical wiring to the pump, said method comprising:

providing a gas-operated pump in the well with the pump including a housing, at least one aperture in the housing leading to an interior chamber within the housing whereby flowable material from the well can enter the chamber and a valve responsive to gas under pressure to close the aperture and force flowable material from the chamber out of the pump and to a reduction in such pressure to allow the valve to open to allow flowable material from the well to enter the chamber through the aperture;

supplying a gas under pressure from a remote location which is remote from the well through a conduit to the pump at a desired time to close the valve to terminate entry of the flowable material into the chamber and to force the flowable material from the chamber out of the pump;

terminating the flow of gas under pressure through the conduit to the pump at a desired time;

preventing transmission of device-originated signals from the pump to the remote location which provide information on the level of the flowable material in the pump;

continuously venting gas from the conduit through an orifice during the time that gas under pressure is being supplied through the conduit to the pump and following said step of terminating to bleed gas under pressure from the conduit and the pump to allow flowable material from the well to again enter the chamber;

repeating said step of supplying following said step of terminating and repeating said step of terminating following the last-mentioned step of supplying; and maintaining said orifice continuously open during and between said steps of supplying.

7. A method as defined in claim 6 wherein said step of venting vents no more than about twenty-five percent of the gas under pressure supplied through the conduit for said pump.

8. A method as defined in claim 6 wherein said step of venting is carried out through a variable area orifice and said method includes adjusting the area of the orifice to provide the desired flow through the orifice prior to said step of venting and maintaining the area of the orifice constant during said step of venting.

9. A method as defined in claim 6 wherein said pump is a first pump and said method includes providing a second gas-operated pump in a second well remote from said remote location, supplying gas from said remote location through said conduit to the second pump, terminating the flow of gas under pressure through the conduit to the second pump and continuously venting gas from the conduit through a second orifice adjacent the second well during the time that gas under pressure is being supplied through the conduit to the second pump and following said second-mentioned step of terminating to bleed gas under pressure from the conduit.

10. A method as defined in claim 9 wherein both of said orifices are variable area orifices and including adjusting the areas of the orifices to provide the desired flows through the orifices prior to said steps of venting and maintaining the areas of the orifices constant during said steps of venting.

* * * * *